United States Patent
Hung (10) Patent No.: US 6,679,036 B2
(45) Date of Patent: Jan. 20, 2004

(54) DRIVE GEAR SHAFT STRUCTURE OF A SELF-MOVING TYPE MOWER

(75) Inventor: Yu-Nan Hung, Taiping (TW)

(73) Assignee: Shunchi Crankshaft Co., Ltd., Taichung (TW)

( * ) Notice: Subject to any disclaimer, the term of this patent is extended or adjusted under 35 U.S.C. 154(b) by 250 days.

(21) Appl. No.: 09/977,181

(22) Filed: Oct. 15, 2001

(65) Prior Publication Data

US 2003/0070500 A1 Apr. 17, 2003

(51) Int. Cl.[7] .............................................. A01D 34/82
(52) U.S. Cl. ........................................ 56/11.4; 56/11.8
(58) Field of Search ................................ 56/11.4, 11.5, 56/11.7, 11.8, 14.7, 16.9, 17.5, 16.7, DIG. 6, DIG. 22; 74/606 R, 607, 417

(56) References Cited

U.S. PATENT DOCUMENTS

| | | | |
|---|---|---|---|
| 4,117,652 A | * | 10/1978 | Jones et al. .................. 56/11.8 |
| 4,689,939 A | * | 9/1987 | Seyerle ......................... 56/11.1 |
| 4,841,794 A | * | 6/1989 | Hikishima .................... 74/371 |
| 4,896,487 A | * | 1/1990 | Hikishima et al. ........... 56/11.8 |
| 5,778,645 A | * | 7/1998 | Irikura et al. ................. 56/11.8 |

* cited by examiner

Primary Examiner—Robert E. Pezzuto
(74) Attorney, Agent, or Firm—Charles E. Baxely (57) ABSTRACT

A drive gear shaft structure of a self-moving type mower is provided adjacent to a wheel unit disposed at the bottom portion of a mower, and includes upper and lower housings which co-define a receiving space after assembly thereof; a shaft, a gear, two transmission taper blocks, two securing plates, two securing oil seals, a worm and a trigger rod disposed in the receiving space; and a transmission structure connected to the worm and a transmission spindle of a drive motor of the mower. The structure utilizes motor output power of the cutter of the mower to enable the wheels of the mower to automatically rotate.

17 Claims, 7 Drawing Sheets

DRIVE GEAR SHAFT STRUCTURE OF A SELF-MOVING TYPE MOWER

BACKGROUND OF THE INVENTION (a) Field of the Invention

This invention relates to a mower, more particularly to a device that utilizes motor output power of the cutter of a mower to enable wheels of the mower to automatically rotate.

(b) Description of the Prior Art

A conventional mower structure mainly includes a mower body, wheels, and a handle. The user grips the handle and exerts a force to push forwardly. The mower body moves by means of the wheels therebelow. In the mower body, a motor drives a cutter to rotate at high speed to cut grass and remove the grass from the mower body following the rotational direction of the cutter.

Although the conventional mower can speedily cut grass, the user has to push the mower, which is quite a burden when mowing a large piece of lawn.

SUMMARY OF THE INVENTION

The primary object of the present invention is to provide a drive gear shaft structure of a self-moving type mower, which utilizes motor output power of the cutter of the mower to enable the wheels of the mower to automatically rotate, thereby providing the mower with a self-moving function that can be selectively adopted by the user to make mowing easier.

In order to achieve the abovementioned object, the drive gear shaft structure according to the present invention is provided adjacent to a wheel unit at the bottom portion of the mower, and includes:

- a lower housing and an upper housing which co-define a receiving space after assembly thereof;
- a shaft extending through the upper and lower housings and having two ends extending outwardly, with end portions respectively provided with shaft end gear and engaging toothed rings within the wheels of the mower;
- a gear sleeved on the shaft in the receiving space, an inner edge of the gear being constituted by two opposite taper holes extending therethrough;
- two transmission taper blocks sleeved and positioned on two sides of the gear of the shaft, with taper bodies disposed in the taper holes of the gear;
- two securing plates sleeved on the shaft adjacent to the two transmission taper blocks, one of the securing plates abutting against an inner wall surface of the lower housing;
- two securing oil seals sleeved on two ends of the shaft to draw the above components toward the gear, the two securing oil seals being positioned in a receiving recess of the upper and lower housings;
- a worm vertically disposed in the receiving space defined by the upper and lower housings, the worm engaging the gear;
- a transmission structure having one end connectedly provided at an end portion of the worm and another end connected to a transmission spindle of a drive motor of the cutter of the mower; and
- a trigger rod vertically disposed in the receiving space adjacent to one of the transmission taper blocks, a top end of the trigger rod being connected to a pull structure controlled by the user for controlling the trigger rod to push the transmission taper block;

whereby the pull structure enables the trigger rod to rotate; the bow portion pushes the securing plate to move in the direction of the gear; the two transmission taper blocks abut tightly against taper holes of the gear with taper surfaces thereof, and the transmission taper blocks bring the shaft and wheels of the mower to rotate, thereby enabling the mower to have a self-moving mode.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Referring to FIGS. 2 to 5, a gear shaft structure of a self-moving type mower is disposed adjacent to one of the wheel units mounted at the bottom portion of a mower. The device mainly includes a lower housing 90 and an upper housing 91, a shaft 10, a gear 15, two transmission taper blocks 20, 20', two lubricating units 25, 25', two outer cover rings 30, 30', a buffer pad 35, a first securing plate 40, a second securing plate 45, two securing oil seals 50, 50', a worm 55, a transmission structure 60, a trigger rod 65, and a main body securing plate 75.

The lower and upper housings 90, 91 define a receiving space therebetween after assembly thereof.

The shaft 10 extends through the upper and lower housings 91, 90, and has two ends extending outwardly and fitted with the lubricating units and extending through securing disks 3 at two sides of the mower 1. End portions are each provided with a shaft end gear 12 for engaging a toothed ring 5 in the rear wheel 4 of the mower.

The gear 15 is sleeved on the shaft 10 and located in the receiving space. The inner edge of the gear 15 is constituted by two opposite taper holes 151, 151' extending therethrough.

The transmission taper blocks 20, 20' are sleeved on two sides of the gear 15 of shaft 10, with the taper body disposed in the taper holes 151, 151' of gear 15. Each of the opposite wall surfaces of the central holes of the transmission taper blocks 20, 20' extends radially to form a pin space 201, 201. The body of the shaft 10 has spring pin 11, 11' extending radially therethrough relative to the two transmission taper blocks 20, 20'. Two ends of the spring pins 11, 11' extend through the pin space 201, 201' to achieve a linking relationship between transmission taper blocks 20, 20' and shaft 10.

The lubricating units 25, 25' are constituted by two pads 251, 251' which sandwich a respective one of bearings 252, 252' and are sleeved on the shaft 10 adjacent to the two transmission taper blocks 20, 20'.

The outer cover rings 30, 30' are sleeved on the shaft 10 adjacent to the two lubricating units 25, 25' to thereby position the two lubricating units 25, 25'.

The buffer pad 35 is sleeved on the shaft 10 adjacent to one outer cover ring 30.

The first securing plate 40 is sleeved on the shaft 10 adjacent to the other outer cover ring 30'.

The second securing plate 45 is a slightly bent plate sleeved on the shaft 10 adjacent to the buffer pad 35.

The securing oil seals 50, 50' are sleeved on the two ends of the shaft 10 to draw the above components toward the gear 15, and straddle in receiving recesses 92, 93 preformed in the upper and lower housings 90, 91 such that the first securing plate 40 has a lateral surface abutting against the inner wall surface of the lower housing 90.

The worm 55 is vertically disposed in the receiving space defined by the upper and lower housings 91, 90, and has two ends respectively positioned by bearings 551, 552. The worm 55 engages the gear 15. The upper section thereof is a smooth rod section that extends through the upper housing 91.

Figure 1:
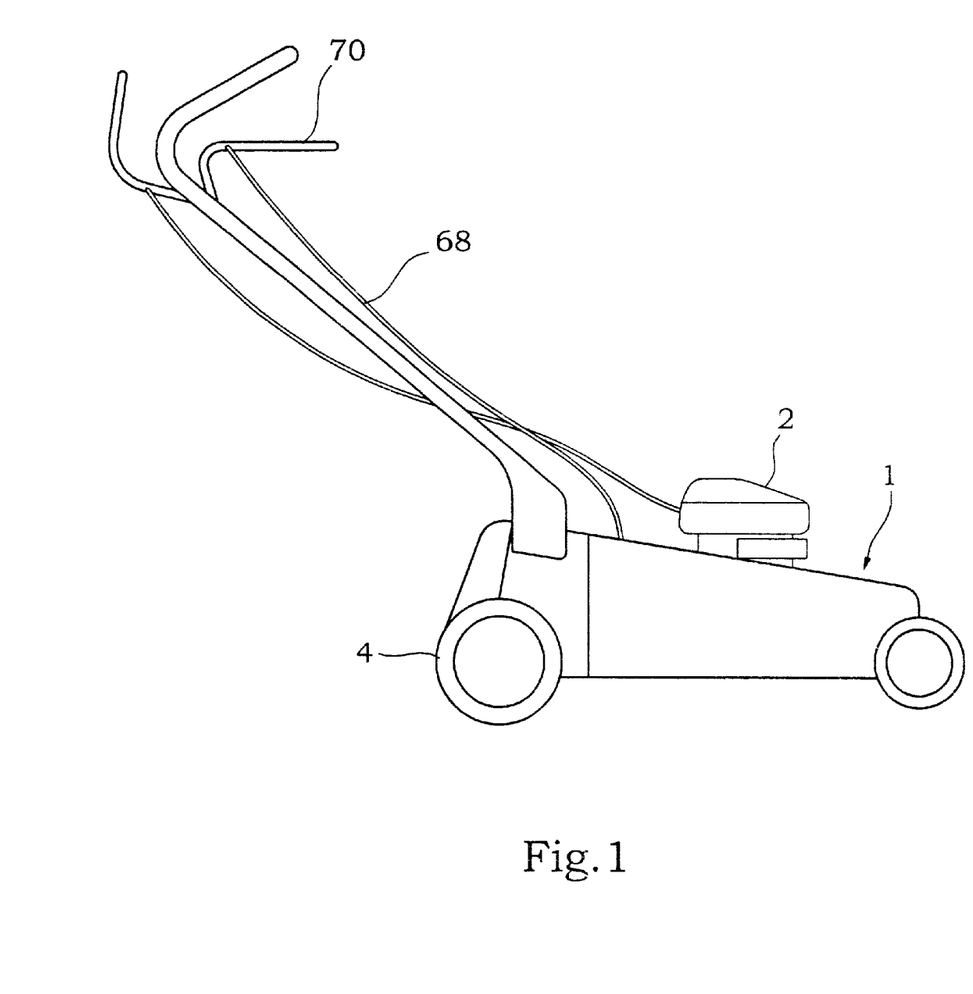
FIG. 1 is a plan side view of a mower according to the present invention.
Figure 2:
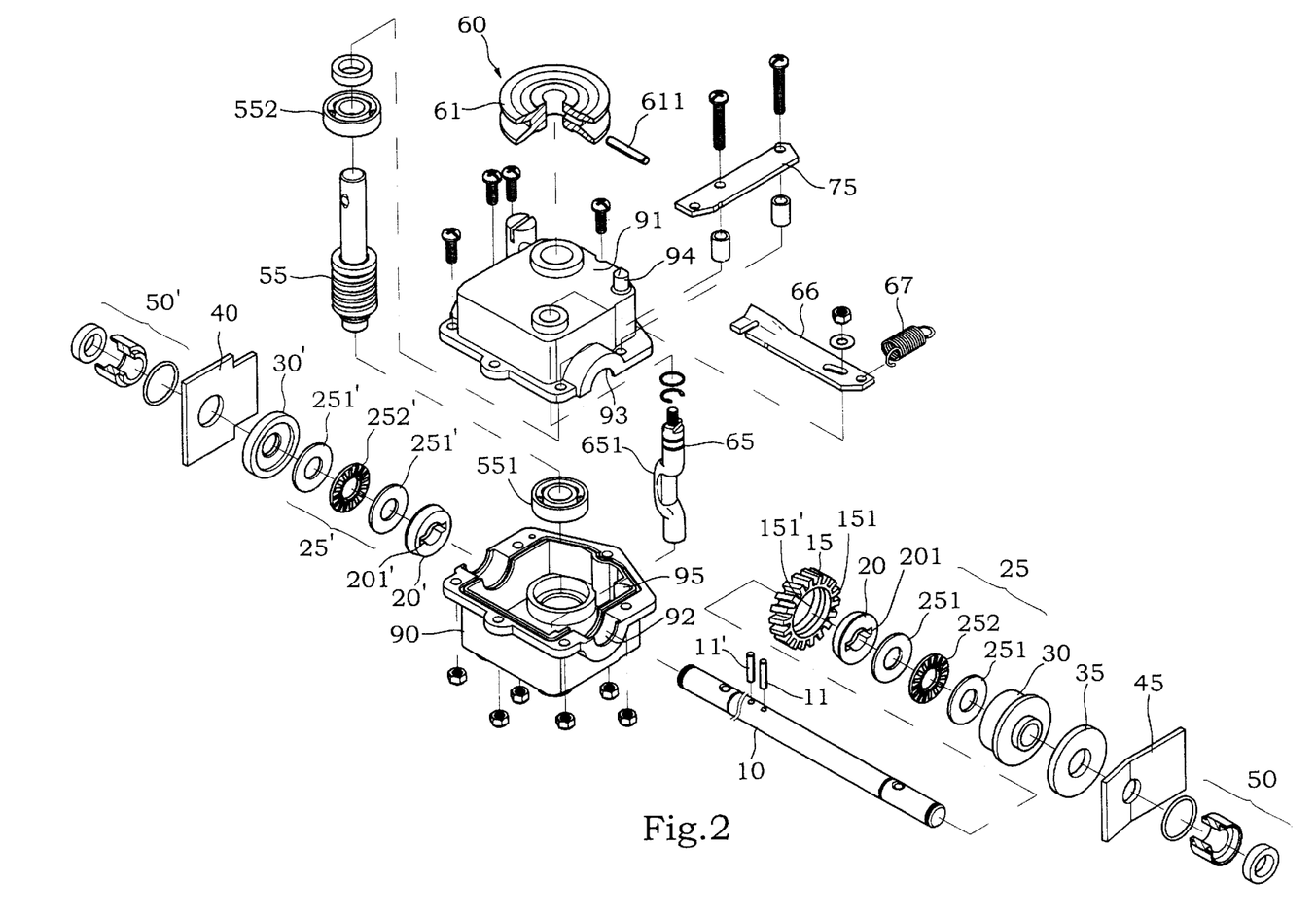
FIG. 2 is an exploded perspective view of a self-moving drive device according to the present invention.
Figure 3:
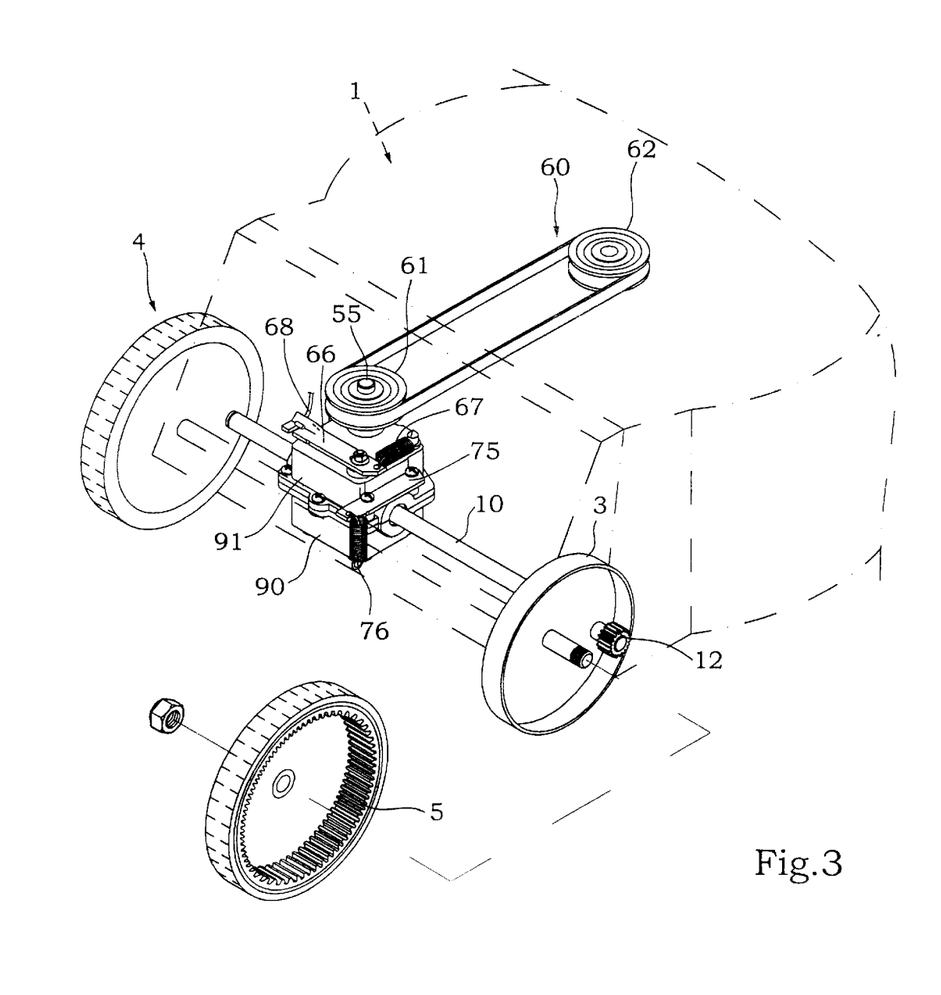
FIG. 3 is a schematic view showing the self-moving drive device of the present invention in an assembled state and the operation thereof.
Figure 4:
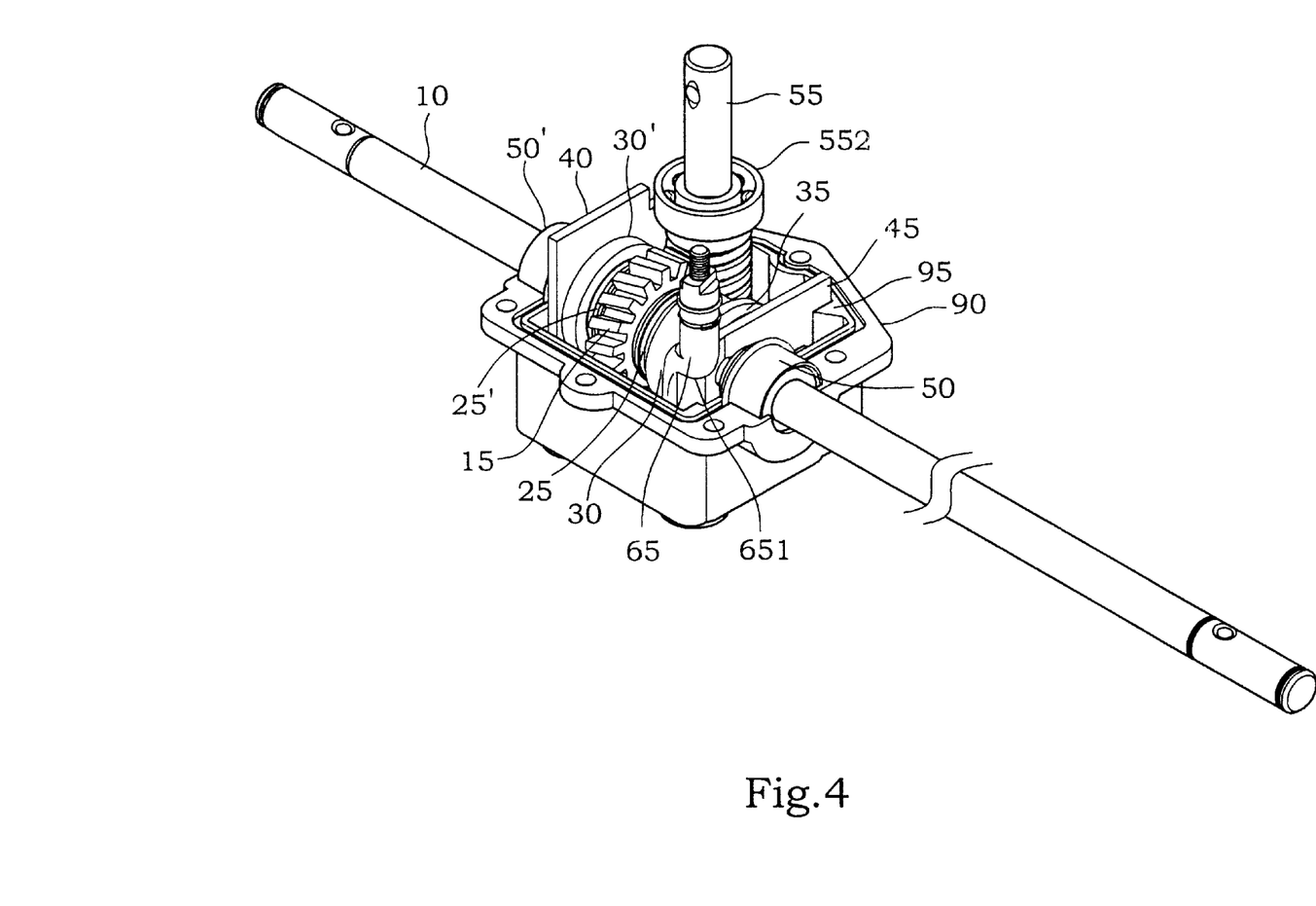
FIG. 4 is an assembled view of the interior of the self-moving drive device of the present invention.

The transmission structure 60 is formed by a belt pulley unit, in which a belt pulley 61 is sleeved on the smooth rod section of the worm 55 and secured in position by a pin. Another belt pulley 62 is provided on the transmission spindle of a drive motor 2 (see FIG. 1) of the cutter of the mower 1.

The trigger rod 65 is vertically disposed in the receiving space adjacent to the second securing plate 45 and has a portion which corresponds to the second securing plate 45 eccentrically bent to form a bow portion 651. The top end of the trigger rod 65 extends outwardly of the upper housing 91 to connect to a pull structure. The pull structure includes a trigger plate 66, which is sleeved and secured at the top end of the trigger rod 65. One end of the trigger plate 66 is connected to an end portion of a spring 67. The other end of the spring 67 is sleeved on a projecting post 94 on the surface of the upper housing 91. The other end of the trigger plate 66 is connected to a pull cord 68, which extends along the push rod of the mower and connects with a control handle 70.

The main body securing plate 75 is locked on the outer sides of the upper and lower housings 91, 90, and is connected to a spring 76. The other end of the spring 76 is secured on the outer housing of the mower 1 to balance and position the upper and lower housings 91, 90.

Figure 5:
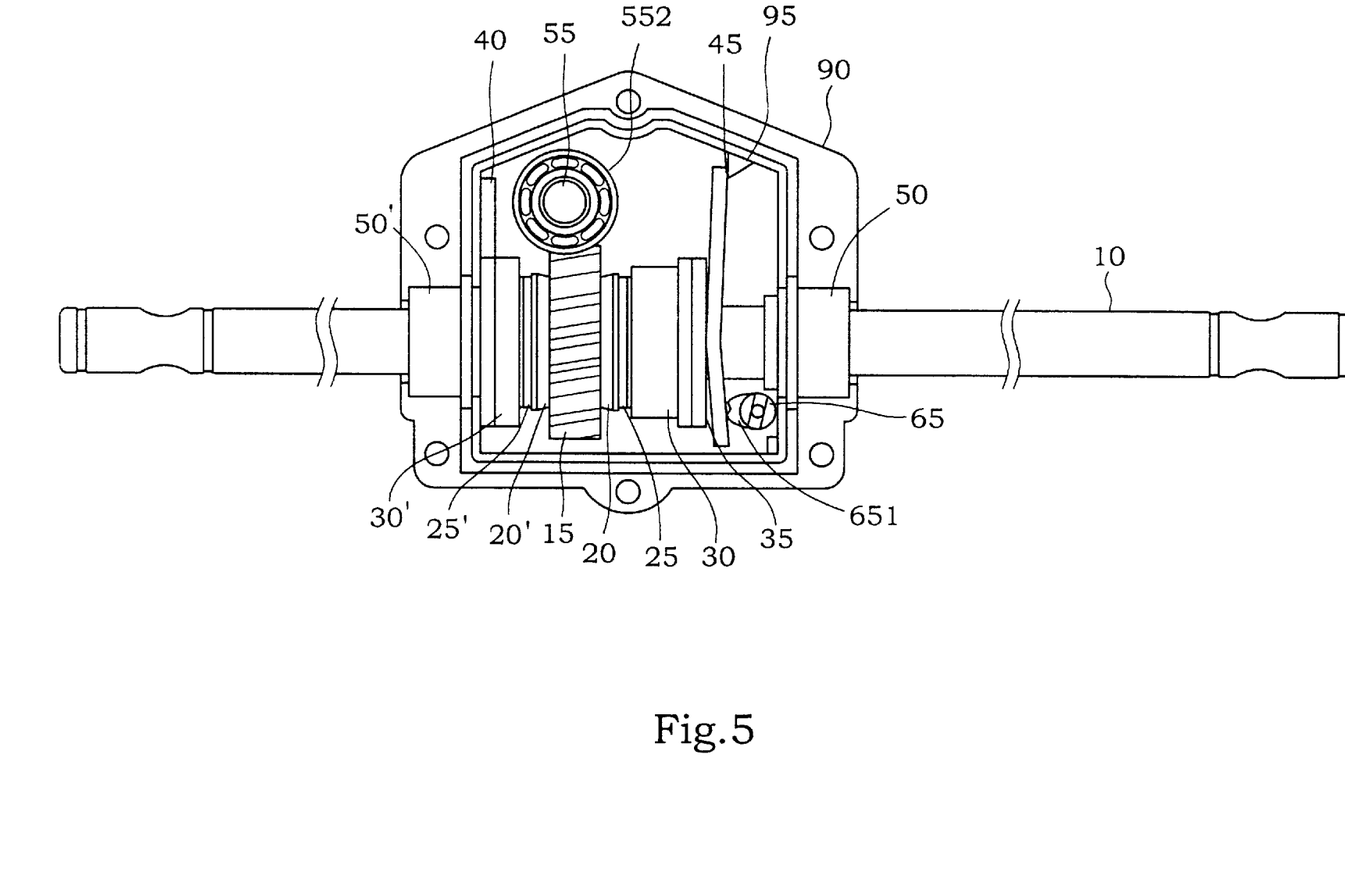
FIG. 5 is a plan top view of FIG. 4.
Figure 6:
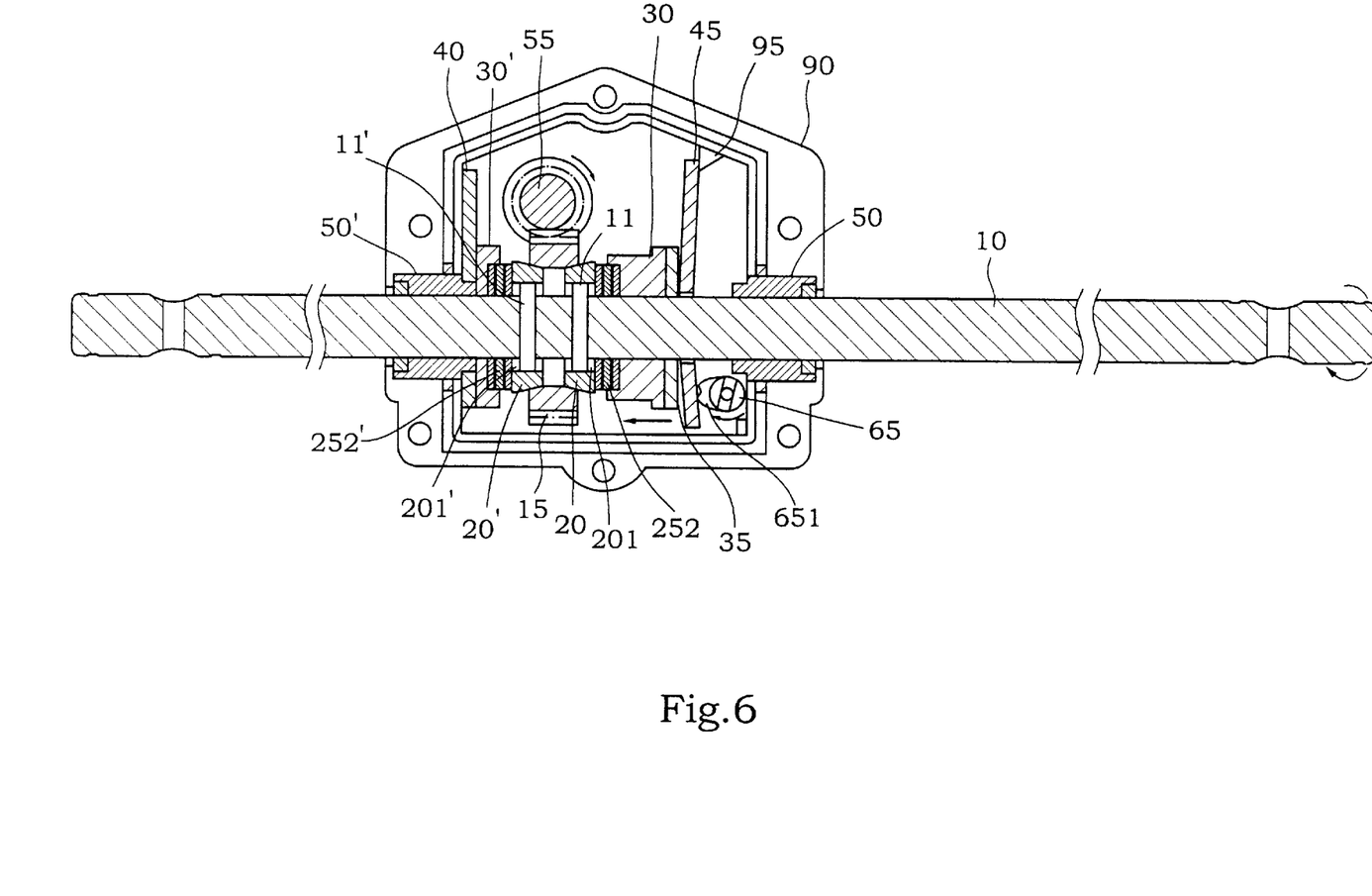
FIG. 6 is a sectional view of the self-moving drive device of the present invention.
Figure 7:
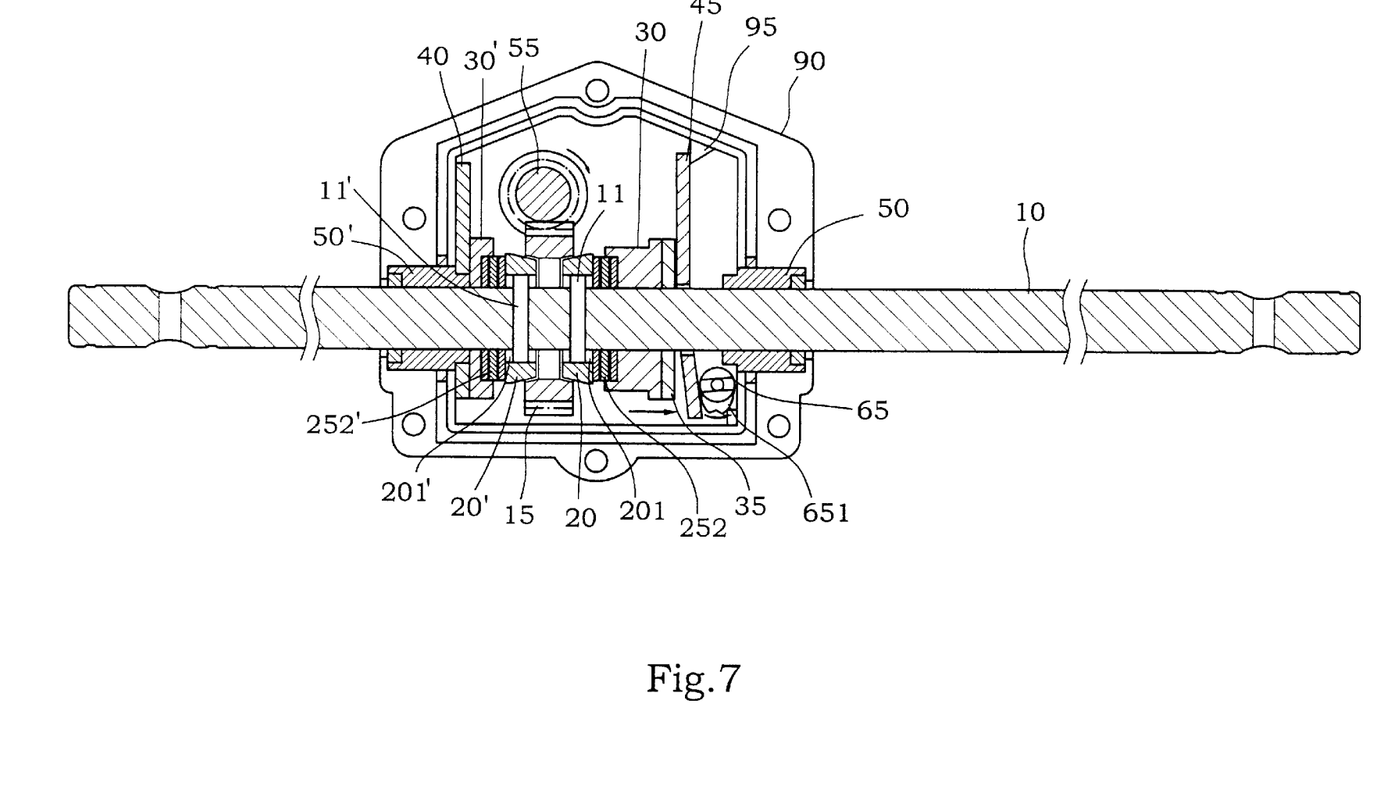
FIG. 7 is another sectional view of the self-moving drive device of the present invention.

The operation and functions of the present invention will now be described hereinafter with reference to FIGS. 5 and 6.

The user pulls the control handle 70 to drag the trigger plate 66 via the pull cord 68 to thereby cause the trigger rod 65 to rotate about a predetermined angle. The bow portion 651 pushes the end portion of the second securing plate 45 to move in the direction of the gear 15. The other end of the second securing plate 45 moves in the opposite direction and abuts against a stop portion 95 of the lower housing 90. The second securing plate 45 exerts a pushing force on the outer cover ring 30. The pushing force is transmitted via the lubricating unit 25 to the transmission taper block 20. Since the first securing plate 40 abuts against the inner wall of the lower housing 90, another set of the outer cover ring 30', lubricating unit 25' and transmission taper block 20' will produce a counter reaction. The two sets of components push in the direction of the gear 15 at the same time so that the transmission taper blocks 20, 20' urge tightly against the taper holes 151, 151' of the gear 15 with their taper surfaces. The transmission structure 60 transmits the power of the transmission motor 2 of the mower 1 to the worm 55. The worm 55 rotates to engage the gear 15. The gear 15 then can bring the two transmission taper blocks 20, 20' to rotate. Since the shaft 10 is connected to the transmission taper blocks 20, 20' via the spring pins 11, 11', the transmission taper blocks 20, 20' can bring the shaft 10 to rotate. The shaft end gear 12 then drives the rear wheel 4 of the mower 1 to rotate so that the mower is in a self-moving mode. The user only needs to steer the mower and can easily control the mower.

On the other hand, when it is not necessary to utilize the self-moving function of the mower, the control handle 70 is released so that the elastic restoration force of the spring 67 pulls the trigger plate 66 and trigger rod 65 to rotate a predetermined angle to bring the bow portion 651 to move away from the second securing plate 45, so that the force acting upon the transmission taper blocks 20, 20' and the counter action disappear. Although the transmission taper blocks 20, 20' are still located in the taper holes 151, 151' of the gear 15, they are not in tight abutment with respect to each other. Therefore, the rotating worm 55 and gear 15 cannot act upon the transmission taper blocks 20, 20' and shaft 10, and the rear wheel 4 is in a stationary state and will rotate only when the mower is pushed by the user. The rear wheel 4 will rotate by application of an external force, but it will not bring the transmission taper blocks 20, 20' to rotate therewith since the transmission taper blocks 20, 20' do not urge against the taper holes 151, 151' of the gear 15 tightly. Therefore, there is not a reverse pressure on the gear 15, and the transmission structure 60 and worm 55 can rotate smoothly.

What is claimed is:

1. A drive gear shaft structure of a self-moving type mower which is disposed adjacent to a respective one of wheel units at the bottom portion of a mower, said structure comprising:

a lower housing and an upper housing which co-define a receiving space after assembly thereof;

a shaft extending through said upper and lower housings and having two ends extending outwardly, with end portions respectively provided with shaft end gear and engaging toothed rings within the wheels of the mower;

a gear sleeved on said shaft in said receiving space, an inner edge of said gear being constituted by two opposite taper holes extending therethrough;

two transmission taper blocks sleeved and positioned on two sides of said gear of said shaft, with taper bodies disposed in said taper holes of said gear;

a worm vertically disposed in said receiving space defined by said upper and lower housings, said worm engaging said gear;

a transmission structure having one end connectedly provided at an end portion of said worm and another end connected to a transmission spindle of a drive motor of a cutter of the mower; and a trigger rod vertically disposed in said receiving space adjacent to one of said transmission taper blocks, a top end of said trigger rod being connected to a pull structure controlled by the user for controlling said trigger rod to push said transmission taper block.

2. A drive gear shaft structure of a self-moving type mower as claimed in claim 1, wherein opposite wall surfaces of a central hole of said transmission taper block respectively and radially extend to form a pin space, said shaft relative to said two transmission taper blocks having spring pins extending respectively and radially therethrough, two ends of said spring pin extending through said pin space to constitute a rotational linking relationship between said transmission taper block and said shaft.

3. A drive gear shaft structure of a self-moving type mower as claimed in claim 1, further comprising two securing plates sleeved on said shaft adjacent to said two transmission taper blocks, one of said securing plates abutting against an inner wall surface of said lower housing, the other securing plate contacting an outer periphery of said trigger block.

4. A drive gear shaft structure of a self-moving type mower as claimed in claim 3, wherein said trigger block pushes one end portion of said securing plate to move in the direction of said gear, the other end of said securing plate moving in an opposite direction to abut against a stop portion of said lower housing.

5. A drive gear shaft structure of a self-moving type mower as claimed in claim 3, wherein said shaft has a lubricating unit sleeved thereon between a respective one of transmission taper blocks and a respective one of said securing plates.

6. A drive gear shaft structure of a self-moving type mower as claimed in claim 5, wherein said lubricating unit is formed by two pads which sandwich a bearing therebetween.

7. A drive gear shaft structure of a self-moving type mower as claimed in claim 6, wherein said shaft has an outer cover ring sleeved thereon between a respective one of said lubricating units and a respective one of said securing plates.

8. A drive gear shaft structure of a self-moving type mower as claimed in claim 7, further comprising two securing oil seals sleeved on two ends of said shaft to draw said two transmission taper blocks, said two lubricating units and said two outer cover rings toward said gear.

9. A drive gear shaft structure of a self-moving type mower as claimed in claim 8, wherein said securing oil seals are positioned in a receiving recess of said upper and lower housings.

10. A drive gear shaft structure of a self-moving type mower as claimed in claim 1, wherein said worm is positioned between said upper and lower housings via two bearings.

11. A drive gear shaft structure of a self-moving type mower as claimed in claim 1, wherein said transmission structure is constituted by belt pulleys.

12. A drive gear shaft structure of a self-moving type mower as claimed in claim 11, wherein one of said belt pulleys of said transmission structure is sleeved on said worm, and the other one of said belt pulleys is sleeved on the transmission spindle of the drive motor of the cutter of the mower.

13. A drive gear shaft structure of a self-moving type mower as claimed in claim 1, wherein said pull structure includes a trigger plate, said trigger plate being secured at a top end of said trigger rod, said trigger plate having one end connected to a pull cord connected to a control handle.

14. A drive gear shaft structure of a self-moving type mower as claimed in claim 13, wherein the other end of said trigger plate is connected to an end portion of a spring, the other end of said spring being secured on the surface of said upper housing.

15. A drive gear shaft structure of a self-moving type mower as claimed in claim 1, wherein a main body securing plate is locked to outer sides of said upper and lower housings, said main body securing plate having one end secured on a housing of the mower.

16. A drive gear shaft structure of a self-moving type mower as claimed in claim 15, wherein said main body securing plate is connected to the housing of the mower via a spring.

17. A drive gear shaft structure of a self-moving type mower as claimed in claim 1, wherein a section of said trigger rod relative to said transmission taper block is eccentrically formed as a bow portion.

* * * * *